(12) United States Patent
Hannam

(10) Patent No.: US 10,677,621 B1
(45) Date of Patent: Jun. 9, 2020

(54) SENSOR APPARATUS FOR TWO-WIRE SENSOR MEASUREMENT AND INFORMATION READ-OUT SYSTEM

(71) Applicant: Continental Control Systems, LLC, Longmont, CO (US)

(72) Inventor: Gerald Anthony Hannam, Loveland, CO (US)

(73) Assignee: Continental Control Systems LLC, Longmont, CO (US)

(*) Notice: Subject to any disclaimer, the term of this patent is extended or adjusted under 35 U.S.C. 154(b) by 177 days.

(21) Appl. No.: 15/710,663

(22) Filed: Sep. 20, 2017

(51) Int. Cl.
*G01D 18/00* (2006.01)
*H04B 3/54* (2006.01)

(52) U.S. Cl.
CPC ........... *G01D 18/008* (2013.01); *H04B 3/542* (2013.01)

(58) Field of Classification Search
CPC ..................... G01D 18/008; G06F 13/423
See application file for complete search history.

(56) References Cited

U.S. PATENT DOCUMENTS

| | | | |
|---|---|---|---|
| 4,736,367 | A | 4/1988 | Wroblewski et al. |
| 5,210,846 | A | 5/1993 | Lee |
| 5,563,506 | A | 10/1996 | Fielden et al. |
| 5,857,777 | A | 1/1999 | Schuh |
| 6,636,028 | B2 | 10/2003 | Lavoie et al. |
| 6,892,144 | B2 | 5/2005 | Slater et al. |
| 6,988,043 | B1 | 1/2006 | Randall |
| 7,305,310 | B2 | 12/2007 | Slota et al. |
| 8,421,443 | B2 | 4/2013 | Bitsch et al. |
| 8,847,576 | B1 | 9/2014 | Hannam et al. |
| 2013/0120032 | A1* | 5/2013 | Quiquempoix ..... G06F 13/4282 327/142 |
| 2013/0257465 | A1* | 10/2013 | Kassem ................ A61B 5/031 324/706 |
| 2015/0077254 | A1 | 3/2015 | Leyden et al. |

FOREIGN PATENT DOCUMENTS

WO 2017180637 A1 10/2017

OTHER PUBLICATIONS 1451.2-1997 IEEE Standard for a Smart Transducer Interface for Sensors and Actuators—Transducer to Microprocessor Communication Protocols and Transducer Electronic Data Sheet (TEDS) Formats.
1451.1-1999 IEEE Standard for a Smart Transducer Interface for Sensors and Actuators—Network Capable Application Processor (NCAP) Information Model.
1451.0-2007 IEEE Standard for a Smart Transducer Interface for Sensors and Actuators—Common Functions, Communication Protocols, and Transducer Electronic Data Sheet (TEDS) Formats.
1451.4-2004 IEEE Standard for a Smart Transducer Interface for Sensors and Actuators—Mixed-Mode Communication Protocols & TEDS Formats.

(Continued)

*Primary Examiner* — Bryan Bui
(74) *Attorney, Agent, or Firm* — James R. Young; Cochran Freund & Young LLC

(57) ABSTRACT

A system for storing transducer information in a memory device includes a memory device connected with a transducer by a circuit that enables a meter or data acquisition circuit to access transducer signals and the transducer information from the memory device over a single pair of wires.

12 Claims, 10 Drawing Sheets

(56) References Cited

OTHER PUBLICATIONS

"DS28E07 1024-Bit, 1-Wire EEPROM," Maxim Integrated Products, Dallas Division, 14575 Dallas Pkwy, Dallas, Texas 75254 (htts://www.maximintegrated.com/en/products/digital/memory-products/DS28E07.html).

Bernhard Linke, "Overseiew 1-Wire Technology and its Use, 1-Wire® Devices Measurement Circuits, Switches, and Multiplexers, Temperature Sensors," Jun. 19, 2008, Application Note 1796, Maxim Integrated Products, Dallas Division, 14675 Dallas Pkwy, Dallas, Texas 75254 (Dec. 3, 2002) (www.maxim-ic.com/an796).

* cited by examiner

SENSOR APPARATUS FOR TWO-WIRE SENSOR MEASUREMENT AND INFORMATION READ-OUT SYSTEM

BACKGROUND OF THE INVENTION

Field of the Invention

This invention is in the field of sensors and, more particularly, a sensor equipped with a transducer and a memory device that stores data comprising information about the sensor, which may include information about the transducer, and systems for accessing and transferring such data in addition to analog measurement outputs of the transducer over a single pair of wires to a meter or other device.

State of the Prior Art

There are methods of sending both power and communications over a single pair of wires. One such method specifically for transfer of both analog sensor signals and digital data signals with a 2-conductor interface between a constant current powered sensor and a data acquisition system is described in IEEE Standard 1451.4-2004 as a Class 1 Multi-mode Interface (MMI). An example of such a prior art, 2-conductor, Class 1 MMI according to the IEEE Standard 1451.4-2004 is illustrated in FIG. 1, wherein two wires 52, 54 connect both an analog transducer 56 and a digital memory device 58 in a constant current powered sensor 64 to a data acquisition system 60. In that FIG. 1 prior art example, the analog transducer 56, the digital memory device 58, and a conventional power and signal conditioning circuitry 62 are packaged together in a constant current powered sensor unit 64 (sometimes referred to herein as "the sensor unit 64" for brevity. The transducer 56 is powered by a constant current source 76 in the data acquisition system 60 and produces an analog signal that is indicative of whatever characteristic is being measured by the transducer 56, e.g., temperature, pressure, or whatever. The memory device 58 in the sensor unit 64 can comprise a 1-Wire EEPROM. Such 1-Wire devices are well-known and use a single pair of wires for both powering the device and conducting communications data to and from the device. In FIG. 1, such single pair of wires is illustrated as the wires 52, 54 connected to the sensor unit 64, where one wire 80 is connected to a single input/output pin IO of the memory device 58 with a second wire 82 used for ground reference connected to the GND pin on the memory device 58. A resistor 81 is provided between the two wires 80, 82, i.e., between the GND and the IO pin of the memory device 58, for discharging the system capacitance to ensure that the logic 0 voltage is met within the proper timing for the digital memory device 58. Two diodes 66 and 68 isolate the analog transducer 56 function and the digital memory device 58 function from each other. Essentially, the data acquisition system 60 turns on the digital memory device 58 in the sensor unit 64 by using a switch 70 to apply a negative voltage from a negative logic voltage supply 72 (at a negative voltage commensurate with the memory device 58 turn-on specifications) to the signal line 52. That negative voltage on the signal line 52 turns on the digital memory device 58 and turns off the analog circuitry 57 of the transducer 56, which includes the transducer 57 and the power and signal condition circuitry in FIG. 1, because the diode (D1) 66 is reverse biased. Communication between the digital memory device 58 and the data acquisition system 60 in the sensor unit 64 can then be performed by toggling the appropriate input/output (I/O) line 74 in the data acquisition system 60. Then, to perform measurements with the analog transducer 56, the switch 70 in the data acquisition system 60 is switched from the negative digital logic supply 72 and the input/output (I/O) 74 to the constant current supply 76 in the data acquisition system 60, which has a positive supply voltage. Therefore, this switch to the constant current supply 76 in the data acquisition system 60 applies the positive voltage, constant current from the constant current supply 76 to the signal line 52, thus also to the constant current powered sensor 64. This positive voltage on the signal line 52 turns off the digital memory device 58 in the sensor unit 64, since the second diode 68 is now reverse biased. At the same time, the first diode 66 is now forward biased, so the transducer circuitry 57 is turned on to power the analog transducer 56, which imposes an analog voltage signal on the transducer circuitry 57 in proportion to whatever physical characteristic the transducer 56 is sensitive, e.g., temperature, pressure, or whatever. The analog voltage signal imposed by the transducer 56 is conditioned (e.g., amplification, noise suppression, etc.) by conventional power and signal condition circuitry 62 in the sensor unit 64 and transmitted back through the signal line 52 to an analog signal output 78 in the data acquisition system 60. The return wire 54, which is the second conductor of the 2-conductor, Class 1 MMI between the data acquisition system 60 and the sensor unit 64, is simply the common or ground that completes the circuits described above.

The U.S. Pat. No. 5,857,777 issued to Schuh on Jan. 12, 1999, illustrates the concept of a "smart" sensing device in which a memory storing custom calibration coefficients for a sensor is packaged together with the sensor so that a field signal acquisition unit with a processor that is connected to the "smart" sensing unit can access and download the custom calibration coefficients from the memory for use in outputting correct readings based on the sensor signals. The Institute of Electrical and Electronics Engineers (IEEE) Standard 1451.2-1997 also describes "smart sensors" in which a memory device is packaged with a transducer. The U.S. Pat. No. 8,421,443 issued to Bitsch et al. on Apr. 16, 2013, shows a memory device associated with each current transformer in branch circuits to store correction factors for such current transformers.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

An object of the invention is to provide a less complex and less expensive 2-conductor interface between an electricity meter and a sensor unit that comprises a current transformer and a memory, which stores correction data and other information for the current transformer and is accessible by the electricity meter for correction of current measurement signals produced by the current transformer. Such corrected current measurement signals can then be used for a number of applications, including, for example, improved calculations for power and energy that are based on current measurements.

Another object of the invention is to provide a transducer and a memory packaged together in a sensor unit, wherein only two wires are used for both feeding the sensor signals to a data acquisition circuit and transmitting digital communications between the data acquisition circuit and the sensor unit with minimal circuit complexity in the sensor unit, for example, wherein the analog signal from the transducer can be present on the two wires during the digital communications, and wherein a DC voltage required for digital communications between the data acquisition circuit and the sensor unit can be applied on the two wires without needing to switch the analog signal off.

Another object of the invention is to provide a transducer and a memory, which stores information about the sensor. An important part of this patent is using only two wires for both the sensor signal and digital communications to the sensor memory device with reduced circuit complexity. The analog signal can be present during the digital communications. The DC voltage required for digital communications can be applied without needing to switch the analog signal off. This can be done while the sensor is installed and with a full-scale analog signal present.

Accordingly, an embodiment of the invention includes a sensor unit comprising: (i) sensor circuitry comprising a transducer that generates an analog voltage signal across a first output lead and a second output lead; (ii) an isolating resistor in the first output lead in series with the transducer; and (iii) a 1-Wire memory device with an input/output pin and a ground pin, wherein the input/output pin of the 1-Wire memory device is connected electrically to the first output lead on a first side of the isolating resistor, and wherein the ground pin of the 1-Wire memory device is connected electrically to the first output lead on a second side of the isolating resistor.

In another embodiment, a sensor unit comprises sensor circuitry that includes a transducer which generates an analog voltage signal across a first output lead and a second output lead; a 1-Wire memory device with an input/output pin and a ground pin, wherein the input/output pin of the 1-Wire memory device and the ground pin of the 1-Wire memory device are connected electrically to the first output lead, and wherein the ground in of the 1-Wire memory device is connected electrically to respectively opposite ones of the first output lead and the second output lead; and a diode is connected to the 1-Wire memory device only when the correct voltage polarity is applied, i.e., to the input/output pin of the 1-Wire memory device in a manner that allows current to flow to the input/output pin but not from the input/output pin.

Another embodiment of the invention includes a method of obtaining and applying with a meter correction data for a current transformer packaged together with a 1-Wire memory device in which the correction data are stored, wherein the method includes applying a voltage from the meter to circuitry of the current transformer to which an input/output pin of the 1-Wire memory device and a ground pin of the 1-Wire memory device are electrically connected; toggling the voltage on the circuitry of the current transformer between highs and lows in a data communication protocol that queries the 1-Wire memory device for the correction data; receiving in the meter a data communication message from the 1-Wire memory device that includes the correction data from the 1-Wire memory device; turning off the voltage from the meter to the circuitry of the current transformer to turn off the 1-Wire memory device; receiving in the meter analog signals from the circuitry of the current transformer that are produced by the current transformer in response to an alternating magnetic field produced by an AC current in a primary conductor on which the current transformer is mounted; and applying the correction data in the meter to the analog signals that are produced by the current transformer to provide values that are indicative of correct current and energy flowing through the primary conductor.

In another embodiment, a method of obtaining, with a data acquisition device, information for a sensor unit in which a transducer is packaged together with a 1-Wire memory device in which the information is stored, wherein the method comprises: applying a voltage from the data acquisition device to circuitry of the sensor unit to which an input/output pin of the 1-Wire memory device and a ground pin of the 1-Wire memory device are electrically connected on respectively opposite sides of an isolating resistor; toggling the voltage on the circuitry of the sensor unit between highs and lows in a data communication protocol that queries the 1-Wire memory device for the information; receiving in the data acquisition device a data communication message from the 1-Wire memory device that includes the information from the 1-Wire memory device; turning off the voltage from the data acquisition device to the circuitry of the sensor unit to turn off the 1-Wire memory device; receiving in the data acquisition device analog signals from the circuitry of the transducer that are produced by the transducer in response to sensing of a physical characteristic; and storing the information for processing, transmission, or display.

Another embodiment of the invention includes a method of obtaining and applying with an electricity meter correction data for a current transformer packaged together with a 1-Wire memory device in which the correction factors are stored, comprising: (i) applying a voltage from an electricity meter to a secondary circuit of the current transformer to which an input/output pin of the 1-Wire memory device and a ground pin of the 1-Wire memory device are electrically connected on respectively opposite sides of an isolating resistor; (ii) toggling the voltage on the secondary circuit between highs and lows in a data communication protocol that queries the 1-Wire memory device for the correction data; (iii) receiving in the electricity meter a data communication message that includes the correction data from the 1-Wire memory device; (iv) turning off the voltage from the electricity meter to the secondary circuit of the current transformer to turn off the 1-Wire memory device; (v) receiving in the electricity meter signals from the secondary circuit that are produced by the current transformer in response to an alternating magnetic field produced by a current in a primary winding adjacent to the secondary winding; and (vi) applying the correction data in the electricity meter to the signals from the secondary circuit that are produced by the current transformer to provide values that are indicative of correct current and energy in the primary conductor.

In addition to the example aspects, embodiments, and implementations described above, further aspects, embodiments, and implementations will become apparent to persons skilled in the art after becoming familiar with the drawings and study of the following examples and descriptions.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting. In the drawings.

DETAILED DESCRIPTION OF EXAMPLE EMBODIMENTS

Figure 2:
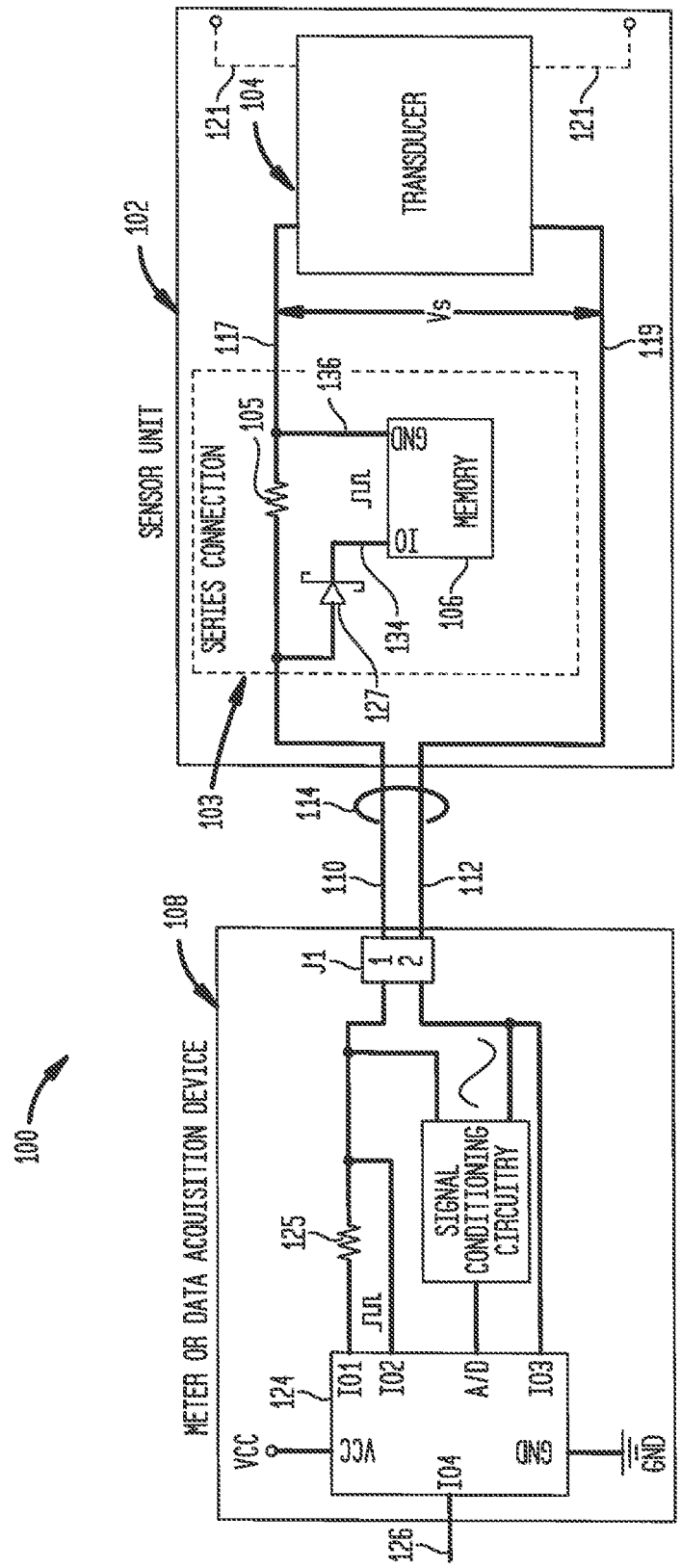
FIG. 2 is a circuit diagram of an example two-wire sensor measurement and information read-out system.

An example two-wire sensor measurement and information read-out system 100 illustrated by the circuit diagram in FIG. 2 comprises a sensor unit 102, which includes a transducer 104 packaged together with a memory device 106, connected electrically to a meter 108 with only two conductors 110, 112. The memory device 106 is connected in series with the transducer 104 and in parallel with an isolating resistor 105, which is placed electrically between the meter 108 and the transducer 104. The transducer 104 can be any device or circuit that converts a physical characteristic or quantity into an analog electrical signal, which is either in the form of an analog voltage signal Vs across two output signal leads 117, 119 or that is converted to an analog voltage signal across the two output signal leads 117, 119, and varies as a function of variations of the physical character or quantity. The physical characteristic or quantity can be, for example, a characteristic or quantity that a user desires to measure or monitor with the transducer 104. For example, it may be electric current, pressure, temperature, flow rate, light intensity, or any of myriad other physical characteristics or quantities that can be sensed with a transducer. The data acquisition circuit 108 receives the analog voltage signal Vs from the output signal leads 117, 119 through the two connecting conductors 110, 112 and performs whatever processing, quantifying, or transmitting function that may be desired for a particular application. For example, the data acquisition circuit 108 may condition the analog voltage signal Vs, quantify the analog voltage signal Vs into units of measure as appropriate for measurements of the characteristic or quantity being measured with the transducer 104, and transmit the measurements through one or more appropriate output lines, for example through the output line 126, to another component or piece of equipment (not shown). For convenience, the meter or data acquisition device 108 is sometimes referred to in this document as "data acquisition circuit" or as "electricity meter" or as "meter," but these terms do not imply any limitation on the functions or capabilities to only electricity metering or only data acquisition functions or capabilities.

The memory device 106 in the sensor unit 102 can contain any useful information or data desired, for example, information or data about the sensor unit 102 or about the transducer 104. For example, such information or data may include a serial number, a location, correction factors needed to correct the analog voltage signals Vs produced by the transducer 104, or other information or data that may or may not be unique to the sensor unit 102 or to the transducer 104. The data acquisition circuit 108 can obtain such information or data from the memory device 106, as will be explained in more detail below, for use in processing the analog voltage signals Vs or for transmission to another component or piece of equipment (not shown). The two connecting conductors 110, 112 are the only two electrical conductors needed between the sensor unit 102 and the data acquisition circuit 108 to perform those functions, as will be explained in more detail below. If desired, the two connecting conductors 110, 112 can be in an interconnecting cord or bus 114, and a connector J1 can be provided for easy and convenient electrical connection of the sensor unit 102 to the data acquisition circuit 108.

In operation, the information in the memory device 106 is accessed by and transferred to the microcontroller 124 in the data acquisition circuit 108 via the two lines 110, 112 that connect the current sensor unit 102 electrically to the electricity data acquisition circuit 108. To activate the memory device 106, a supply voltage is provided by the microcontroller 124 to the memory device 106 via the two wires 110, 112, for example, by driving the input/output pin IO1 of the microcontroller 124 high and driving the input/output pin IO3 of the microcontroller 124 low. Then, with the memory device 106 powered and activated, the microcontroller 124 can send a query message to the memory device 106 through the first wire 110 by toggling the input/output pin IO2 of the microcontroller 124 high and low according to the protocol of the memory device 106. The memory device 106 has internal capacitance which keeps the memory device 106 powered during such short lows when the input/output pin IO of the memory device 106 is receiving and sending communication data (e.g., messages, correction factors, or other information) from and to the microcontroller 124. After the query message from the microcontroller 124 is sent, the input/output pin IO1 on the microcontroller 124 is set high, e.g., at Vcc, to continue powering the memory device 106 while the memory device 106 sends a responsive message with the queried information back to the microcontroller 124. As an example, for the memory device 106, a low signal on the IO2 pin of the microcontroller 124 is detected for voltage levels below 0.5 volts, and a high signal must be at least 0.75 times its supply voltage. In this example, a Vcc of 5.0 volts is supplied to the microcontroller 124. With the input/output pin IO1 of the microcontroller 124 pulled high to Vcc and the input/output pin IO3 of the microcontroller 124 pulled low, a current flows between these two input/output pins through the data detection resistor 125, the isolating resistor 105, and the transducer 104. The IO pin of the memory device 106 is connected by a power and data conductor 134 to one side of the isolating resistor 105, and the GND pin of the memory device 106 is connected by a ground reference wire 136 to the opposite side of the isolating resistor 105. The current flow through the isolating resistor 105 creates a voltage across the isolating resistor 105, which provides a turn-on voltage for the memory 106. To protect against reverse voltages on the memory device 106 from the transducer 104, a diode 127 is placed in series with the memory device 106, e.g., in the power and data conductor 134, to allow the memory device 106 to be powered only when the correct polarity voltage is present on the input/output pin IO of the memory device 106. Therefore, in the FIG. 2 example, the voltage across the sensor device 106 is a diode drop below the voltage across the isolating resistor 105. For example, if the voltage across the isolating resistor 105 is 4.0 volts, the voltage across the sensor device 106 is about 3.6 volts. After the query message is sent by the microcontroller 124 in the data acquisition circuit 108, the input/output pin IO2 of the microcontroller 124 is changed from an output state to an input state to monitor the response from the memory device 106. Then, after the memory device 106 receives the query message from the microcontroller 124, the memory device 106 responds to the microcontroller 124 with a responsive message that includes the queried information, for example, some or all of the information stored in the memory device 106 as explained above, by, for example, driving the input/output pin IO of the memory device 106 low for low-level signals and floating the input/output pin IO of the memory device 106 for high-level signals, which are delivered to the microcontroller 124 over the same first wire 110. The microcontroller 124 detects the high and low signals that comprise the responsive message from the memory device 106, for example, at the input/output pin IO2 or at the analog-to-digital (A/D) converter pin of the microcontroller 124. The information received by the microcontroller 124 is stored in the microcontroller 124 for later use or transmitted from the microcontroller 124 to some other device or equipment. After the responsive message from the memory device 106 is completed and received by the microcontroller 124, the input/output pin IO1 of the microcontroller 124 is disabled, thereby removing power to the memory device 106, and the memory device 106 goes to sleep. The microcontroller 124 then receives the analog voltage signals Vs from the transducer 104.

As explained above, only the two conductors 110, 112 are used both for transmission of the analog signals Vs from the transducer 104 in the sensor unit 102 to the data acquisition circuit 108 and for digital communications between the sensor unit 102 and the data acquisition circuit 108, which minimizes connecting circuit complexity between the sensor unit 102 and the data acquisition circuit 108. Also, the DC voltage required for the digital communications between the sensor unit 102 and the data acquisition circuit 108 can be applied by the data acquisition circuit 108 as explained above without any requirement to disconnect or switch off the analog signal Vs from the transducer 104. Accordingly, the data communications between the memory device 106 in the sensor unit 102 and the microcontroller 124 in the data acquisition circuit 108 can occur while the sensor unit 102 is connected by the two conductors 110, 112 to the data acquisition circuit 108 and with a full-scale analog signal Vs from the transducer 104 present on the conductors 110, 112.

As explained above, the transducer 104 can be any device or circuit that converts a physical characteristic or quantity into an analog electrical signal, which is either in the form of an analog voltage signal Vs across two output signal leads 117, 119 or that is converted to an analog voltage signal Vs across the two output signal leads 117, 119, and varies as a function of variations of the physical character or quantity. The transducer 104 may be a device that produces the analog signal Vs without electric power input from another source (e.g., a photovoltaic device, piezoelectric device, etc.) or it may be powered by an external power source (e.g., a constant current power source, a primary wire or winding of a transformer, etc.) as represented diagrammatically by the phantom lines 121 in FIG. 2.

Figure 3:
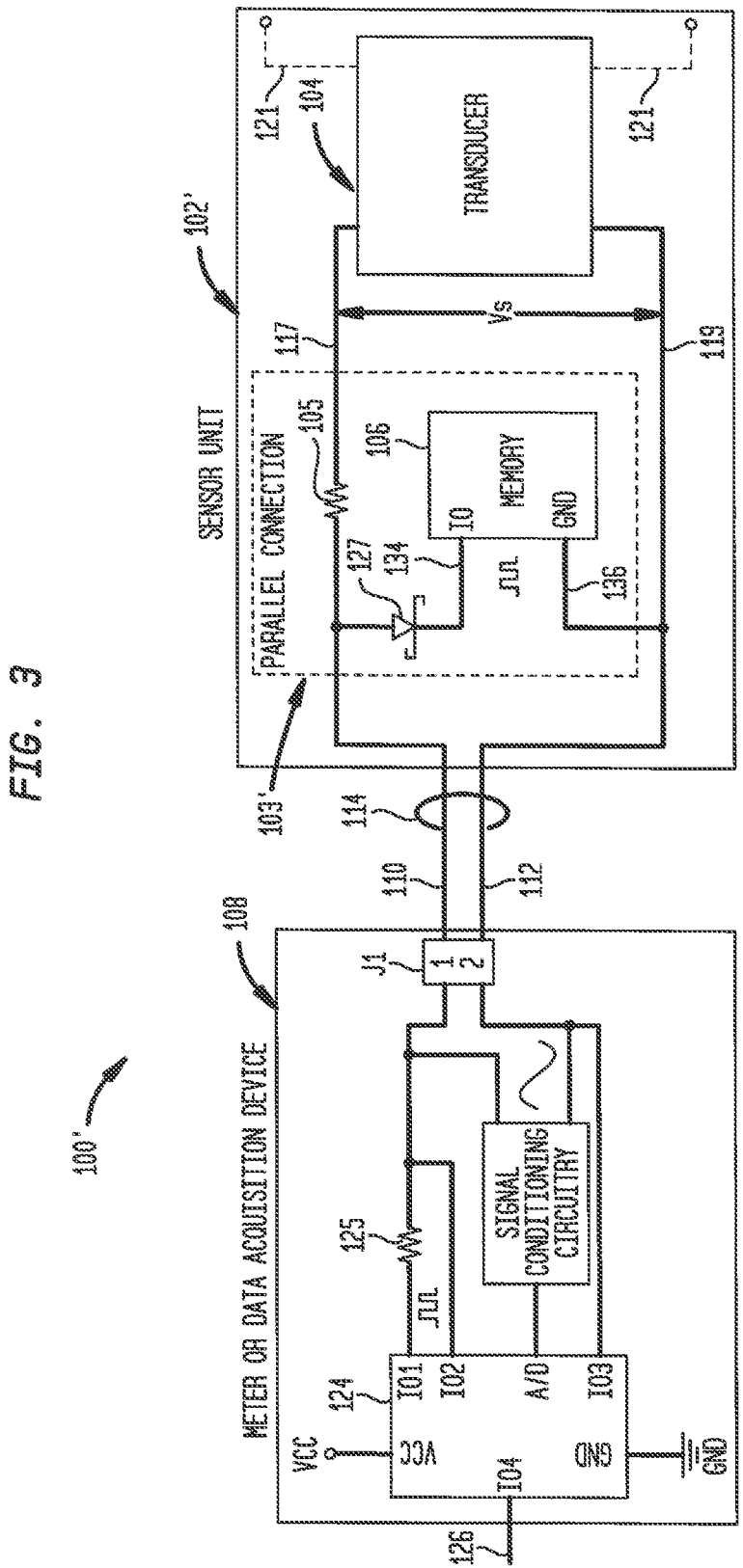
FIG. 3 is a circuit diagram of another example two-wire sensor measurement and information read-out system.

In an alternate embodiment two-wire sensor measurement and information read-out system 100' illustrated by the circuit diagram in FIG. 3, a sensor unit 102', which includes the transducer 104 packaged together with the memory device 106, is connected electrically to the data acquisition circuit 108 with only two conductors 110, 112 similar to the example two-wire sensor measurement and information read-out system 100 described above. However, in this alternate embodiment two-wire sensor measurement and information read-out system 100' in FIG. 3, the memory device 106 is connected in parallel with the transducer 104 and in parallel with the isolating resistor 105, which is placed electrically between the data acquisition circuit 108 and the transducer 104. The turn-on voltage for the memory device 106 in FIG. 3 is provided by the microcontroller 124 in a manner similar to the explanation above for the example two-wire sensor measurement and information read-out system 100 in FIG. 2, but the turn-on voltage provided across the IO and GND pins of the memory device 106 in FIG. 3 is the voltage drop across both the isolating resistor 105 and the transducer 104 less the diode 127 voltage drop in the power and data conductor 134. Therefore, the voltage provided by the microcontroller 124 in FIG. 3 has to be sufficient to provide the required turn-on voltage across IO and GND pins of the memory device 106 while accommodating the data detection resistor 125, the isolating resistor 105, and the transducer 104 voltage drops as well as the diode 127. In other respects, the query by the microcontroller 124 to the memory device 106, the read-out of the stored information from the memory device 106, and the reception, storage, use or transmission of some or all of the information by the microcontroller 124 in FIG. 3 can be the same as described above for the example two-wire sensor measurement and information read-out system 100 of FIG. 2.

The microcontroller 124 in the electricity data acquisition circuit 108 for the examples in FIGS. 2 and 3 can be any general purpose microcontroller that can provide the functions described above and below for powering the memory device 106, querying the memory device 106, and receiving and storing the information from the memory device 106, and then for receiving the signals Vs from the transducer 104, applying the information, and outputting signals (for example, at 126) that are accurate measurements or indicators of the physical characteristics that are sensed by the transducer 104. In the example electric current and metering systems 100 and 100' shown in FIGS. 2 and 3 and described above, a sufficient Vcc voltage is applied to the microcontroller 124 (for example 5 volts) for the IO1 pin of the microcontroller 124 to provide sufficient voltage to meet the turn-on voltage requirement of the memory device 106 as described above. However, if the microcontroller 124 voltage in some application is insufficient to provide the minimum turn-on voltage across the IO and GND pins of the memory device 106, an alternative voltage input can be provided, for example, as shown by the example alternative voltage input Vm in the alternative data acquisition circuit 108' in FIG. 4. For example, the alternative voltage Vm can be 5 volts, and, instead of providing power to the memory device 106 from the pin IO1 of the microprocessor 124 directly, the pin IO1 drives a PNP MOSFET transistor 156, which is tied high through the pull up resistor 125 to the alternative input voltage Vm to provide a voltage above the minimum turn-on voltage to the memory device 106 (not shown in FIG. 4, but shown in FIGS. 2 and 3). A STM32F373CBT6 microprocessor manufactured by STMicroelectronics is one example of a commercially available microcontroller that does not output a high enough voltage to provide at least the minimum turn-on voltage for the memory device 106, but which is suitable for use as the microcontroller 124 along with an alternative, external voltage input Vm, as illustrated in FIG. 4, to provide the functions for the example two-wire sensor measurement and information read-out systems 100 and 100' shown in FIGS. 2 and 3 and described above.

As explained above, the transducer 104 can be a device or circuit that produces an analog voltage signal that is indicative of any of myriad physical characteristics or quantities, for example, an electric current, pressure, temperature, flow rate, light intensity, or other physical characteristics or quantities that can be sensed with a transducer. A current sensor in which the transducer is a current transformer or a Rogowski coil for measuring current in a wire is an example application for which the example two-wire sensor measurement and information read-out systems 100 and 100' shown in FIGS. 2, 3, and 4 and described above are particularly beneficial. Current transformers, including Rogowski coil type current transformers, are common devices used as sensors for measuring alternating current (AC) in electric wires or bus bars, typically, but not exclusively, in AC power distribution systems. Essentially, a current transformer creates a small magnitude AC electric current that is proportional to a larger magnitude AC electric current flowing in an electric wire or bus bar, and the use of a burden resistor on the current transformer output can provide a low voltage signal that is proportional to the larger magnitude AC electric current flowing in the electric wire or bus bar. Low voltage in this context of a current transformer output means a voltage that persons skilled in the art would understand as appropriate for an instrumentation electronic circuit. In the context of the example sensor units 102 and 102', such low voltage output signals Vs are below the turn-on voltage of the memory device 106 or can be reduced to a level below the turn-on voltage of the memory device 106. Burden resistors are not used or needed with Rogowski coil type current transformers, which naturally produce low voltage signals. Such small current or low voltage output signals from current transformers can be used in a variety of instrumentation and control applications, including, for example, electricity meters for measuring and/or metering the amount of electric current that is generated or flowing to an electric load, or measuring and/or metering the amount of power that is used by a load. Measuring and reporting power consumption in residential, commercial, and industrial facilities are example applications of electricity meters that that provide such metering and reporting functions based on current transformer outputs. In many of these kinds of electricity meter applications, the electric power measurements are used for billing purposes, so accurate measurements and reporting of measured electrical power is important. If the power measurements reported by such electricity meters are in error on the high side, then the power consumers who are billed for power usage based on such measurements may be overbilled and would pay for more electric energy or power than actually used. Conversely, if the power measurements reported by such electricity meters are in error on the low side, then the power consumers may not be billed for all of the power or electrical energy that they actually use, and the energy supplier may not obtain the full revenue for the power or electrical energy supplied.

Electric power is the rate, per unit time, at which electric energy is transferred by an electric circuit in, for example, the wire or bus bar mentioned above, and can be calculated at any instant in time by multiplying the current flowing in such wire or bus bar by the voltage of such wire or bus bar. For convenience, such a wire or bus bar in which current is measured with a current transformer is sometimes referred to in this document simply as a primary conductor. As mentioned above, the small current output of the current transformer applied across a burden resistor produces a low voltage signal that is proportional to the current flowing in the primary conductor. Therefore, electricity meters typically use such low voltage signals from current transformers as the basis for calculating current flowing in the primary conductor, and such current multiplied by the voltage of the primary conductor provides a measurement of the electric power that is being transferred by the primary conductor.

Figure 4:
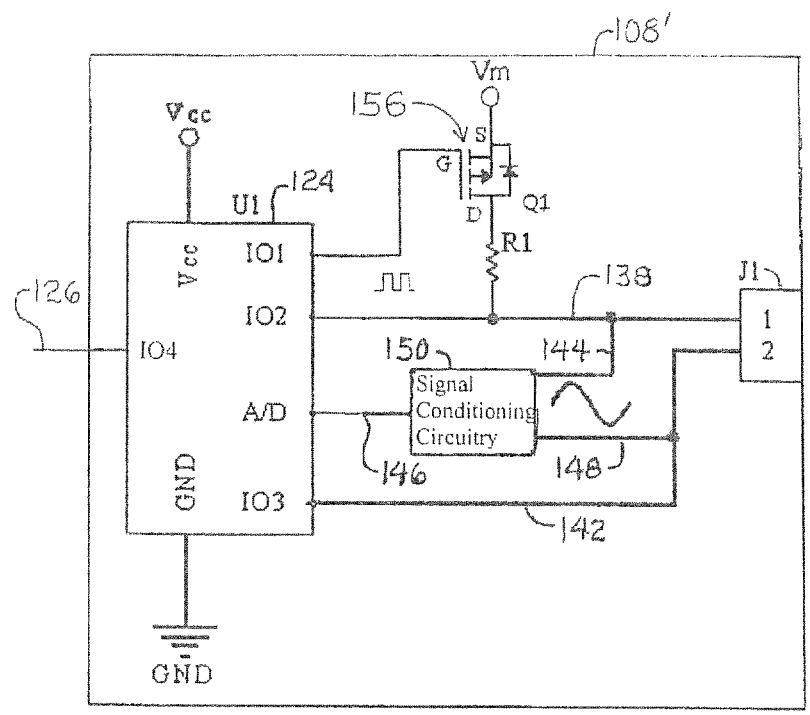
FIG. 4 is a circuit diagram of an alternative embodiment electricity meter similar to the example in FIGS. 2 and 3, but in which the power for the memory device in the current sensor unit is supplied by an auxiliary power source instead of the electricity meter microprocessor.
Figure 5:
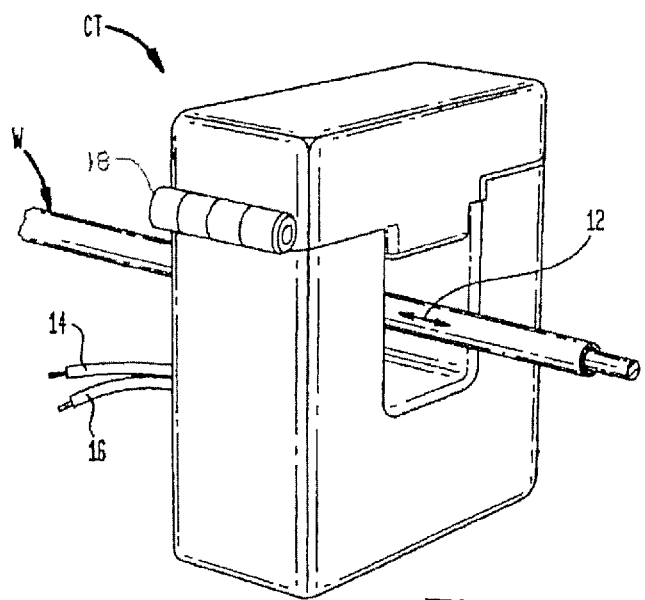
FIG. 5 is diagrammatic isometric view of an example spit-core current transformer.
Figure 6:
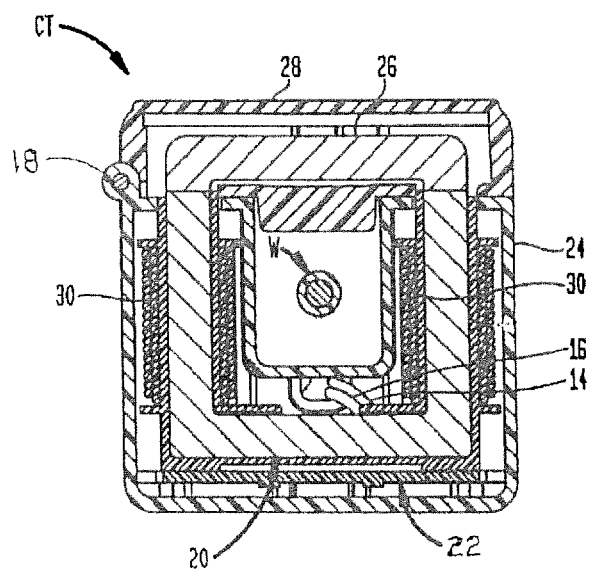
FIG. 6 is a diagrammatic cross-section elevation view of the example split-core current transformer in FIG. 5.

A typical current transformer (CT) configured for use as a current sensor as explained above is shown in FIGS. 5 and 6 to facilitate an explanation of the example two-wire sensor measurement and information read-out systems 100 and 100' illustrated by the circuit diagrams in FIGS. 2, 3 and 4. That example current transformer (CT) comprises a magnetic core 20 configured for encircling a primary conductor W and a secondary winding 30 around at least a portion of the magnetic core 30. The example current transformer CT in FIGS. 5 and 6 is a split core current transformer in which a part 26 of the magnetic core 20 is mounted in a cover module 28 attached by a hinge 18 to a base module 24 so that the cover module 28 with the part 26 of the magnetic core 20 that is in the cover module 28 can be opened for positioning the current transformer CT around the primary conductor W and then closed for use. However, other current transformers have a solid magnetic core (not shown), in which case the primary conductor W must be inserted through the magnetic core. In operation, the primary conductor W acts as a one-turn primary winding for the current transformer CT. A primary AC current flowing in the primary conductor W, as indicated by the arrow 12 in FIG. 5, creates an alternating magnetic field, which is concentrated in the magnetic core 20 of the current transformer CT and induces a secondary AC current in the secondary winding 30. The secondary AC current may be conditioned in a conditioning circuit 22 and output as a signal on two output wires 14, 16, for example, to an electricity meter or other device. Also, the background description above refers to commonly used, split-core and solid core current transformers, but other types of current sensors, for example, Rogowski coils, are also well-known and can be used in many applications.

In theory, the output signal produced by a current transformer is proportional to and in phase with the primary AC current in the primary conductor W. However, in actuality, all current transformers introduce errors which show up in the secondary output signals. Errors commonly specified for current transformers are the ratio error and the phase angle error. Ratio in this context refers to the ratio of the primary AC current in the primary conductor W that is being measured to the output AC current or AC voltage from the secondary winding 30 of the current transformer. Ideally, the ratio of primary turns (commonly one turn when a wire or bus bar W acts as the primary winding) to secondary turns in the secondary winding 30 should define or scale the primary AC current in the primary winding down to the secondary (output) AC current or AC voltage from the secondary winding 30. However, due to flux leakage, core losses, and magnetizing current, the secondary (output) AC current or AC voltage is less than the ideal ratio, so the ideal ratio indicated by the primary winding turn (e.g., the primary conductor W) to the secondary winding turns does not provide a completely accurate measure of the electric current flowing in the primary winding (i.e., in the primary conductor W). Furthermore, the tolerance and temperature sensitivity of the internal burden resistor, if used, will contribute to the ratio error. These same parameters that cause the ratio error, e.g., flux leakage, core losses, and magnetizing current, also cause a phase shift error to occur, which is sometimes called phase angle error or simply phase error. Such phase angle error is not a significant factor for accuracy in current measurements, but it can be a substantial factor in power measurements. Consequently, such an uncompensated phase shift in the current output of the secondary winding as compared to the primary current in the primary conductor W can lead to significant errors in measurements of power, energy, and power factor.

It is possible to use correction terms to correct current transformer outputs for the ratio errors and the phase angle errors inherent in current transformers in order to provide more accurate current and power measurements. For example, in order for an electricity meter, which receives current measurement inputs from a current transformer, to provide more accurate current and power measurement outputs than would be indicated by the raw AC current or AC voltage outputs of the secondary winding, the electricity meter would have to have and to apply correction factors for the particular ratio errors and phase angle errors of the particular current transformer. However, the particular ratio error and phase angle correction factors (terms) required to correct the current signal output for a particular current transformer are unique to that current transformer and would not necessarily work for outputs from other current transformers. Therefore, to achieve such higher output accuracy, that particular current transformer would have to be calibrated to determine what ratio and phase angle correction factors are needed in order or the electricity meter to correct the current measurements from that particular current transformer. Such ratio and phase angle correction factors (terms) can be applied in electricity meters, (e.g., by microcontrollers or other measurement circuitry in the electricity meters) so that the electric current, power, and power factor outputs from the electricity meters are accurate. However, in order for the electricity meter to make such corrections, the ratio error and phase angle error correction factors for a particular current transformer that is connected to an electricity meter have to be provided to the microcontroller or other measurement circuitry in the electricity meter. The correction factors could be entered into the meter microcontroller or measurement circuitry in any conventional manner, for example, using the electricity meter keyboard and display if available or via a communication bus if available, as shown, for example, in U.S. Pat. No. 6,636,028 issued to Lavoie et al. on Oct. 21, 2003, in U.S. Pat. No. 6,892,144 issued to Slater et al. on May 10, 2005, and in U.S. Pat. No. 6,988,043 issued to Randall on Jan. 17, 2006. However, such methods require additional time for installation of the electricity meters and current transformers and are susceptible to errors.

As mentioned above, the Institute of Electrical and Electronics Engineers (IEEE) Standard 1451.2-1997 also describes "smart sensors" in which a memory device is packaged with a transducer. The U.S. Pat. No. 8,421,443 issued to Bitsch et al. on Apr. 16, 2013, shows a memory device associated with each current transformer in branch circuits to store correction factors for such current transformers.

However, for a variety of reasons, many current transformers that are used to provide electric current measurement signals to electricity meters are not packaged with or mounted in the electricity meters, but are separate units. For example, it is not unusual for current transformers to be mounted on primary conductors in circuit breaker boxes or other tight spaces, so installers and users often prefer the current transformers be as small as possible for mounting in such tight spaces, while the electricity meters are placed in more convenient locations. Also, conventional current transformer sensors without any memory for storing correction factors are typically connected electrically to electricity meters with only two wires, which are quite simple to connect and are familiar to electricians and other technicians. Adding more wires to accommodate connection of a memory device in a current transformer sensor to an electricity meter increases complexity, which may increase installation time and make installations by persons familiar with conventional 2-wire connections more susceptible to errors.

Figure 7:
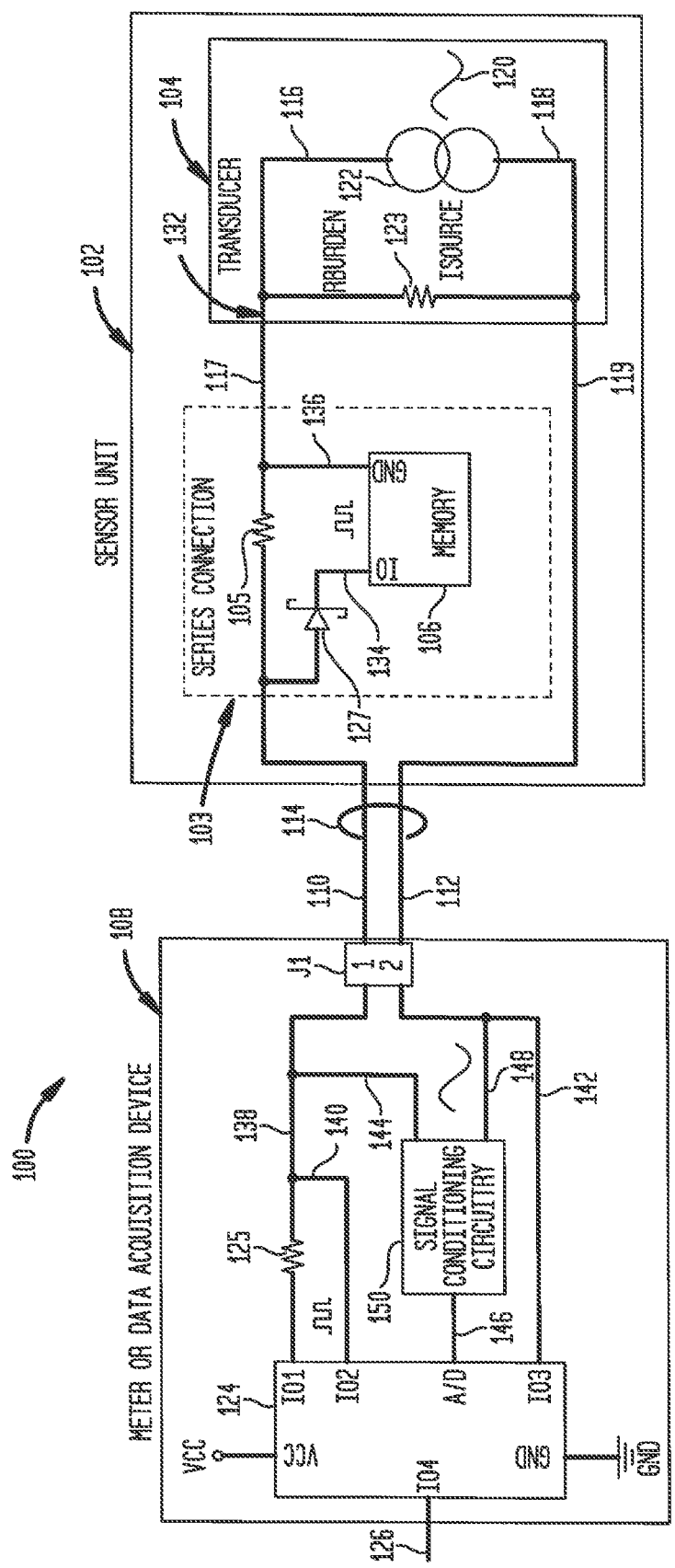
FIG. 7 is a circuit diagram of an example current sensor unit that comprises a current transformer and a memory device, which stores correction data for the current transformer, coupled to an electricity meter with only two conductors.

In FIG. 7, the example two-wire sensor measurement and information read-out system 100 is illustrated as an electric current metering system 100 in which the transducer 104 in the sensor unit 102 is illustrated as a current transformer, and the data acquisition circuit 108 functions as an electricity data acquisition circuit. The current transformer 104 in this example is packaged together with the memory device 106, which stores information about the current sensor unit 102, including, for example, the correction data for the current transformer 104 and any other information about the current transformer 104 that may be deemed beneficial for a particular application or use, although other component packaging variations can be used. As explained above, only two conductors 110, 112 are required between the electricity meter 108 and the sensor unit 102 for providing turn-on power from the electricity meter 108 to the memory device 106, querying the memory device 106 by the microcontroller 124 in the electricity meter 108, transmitting information from the memory device 106 to the microcontroller 124, and transmitting analog voltage signals from the current transformer 104 in the sensor unit 102 to the microcontroller 124 in the electricity meter 108. The two conductors 110, 112 can be, but do not have to be, combined in a single bus or cord 114. The current transformer 104, like many conventional current transformers, can be configured for installation on a primary conductor (not shown in FIG. 7, but see, for example, the current transformer CT installed on the primary conductor W in FIGS. 5 and 6) and to produce an analog signal that is indicative of the amplitude and phase of an alternating electric current (AC current) flowing in such a primary conductor. In other words, the current transformer 104 converts a large amperage AC current in a primary conductor to a low amperage signal that is converted to a voltage Vs by a resistor, for example the burden resistor 123, connected in electrical parallel across the secondary winding 122 of the current transformer 104 in electric current measuring and metering instrumentations. In FIG. 7, the current source symbol 122 indicates the secondary winding of the current transformer 104, and the secondary AC current induced in the secondary winding 122 is indicated by the sinewave symbol 120. The circuitry 132 of the current transformer 104 comprises the secondary winding 122 and first and second winding leads 116, 118, which are extensions of, or connected to, opposite ends of the secondary winding 122 to carry the secondary AC current produced by the secondary winding 122. The burden resistor 123 is shown in FIG. 7 as part of the current transformer 104, but the burden resistor 123 could be external to the current transformer 104. There are many publications available that explain how current transformers work, one example being U.S. Pat. No. 8,847,576, issued Sep. 30, 2014, to Hannam et al., which is incorporated herein by reference for all that it discloses.

As explained above, all current transformers introduce ratio errors and phase angle errors in the output signals, which are unique to each specific current transformer. Therefore, in order to obtain more accurate current measurements with current transformers, each particular current transformer has to be tested to determine the unique ratio error and phase angle error correction terms or factors (sometimes called correction data in this document) that are required to correct the output signals from that particular current transformer to indicate more accurately the magnitude and phase of the actual AC current flowing in the primary conductor (not shown). In the example current metering system 100 shown in FIG. 7, those unique correction data for the particular current transformer 104 in the current sensor unit 102 are programmed into and stored in the memory device 106 in the current sensor unit 102 and applied to the output signal of the current transformer 104 by the microcontroller 124 in the electricity meter 108, so that the output signal of the microcontroller 124 is an accurate measurement or indicator of the actual primary AC current flowing in the primary conductor on which the current transformer 104 is installed. The output signal from the microcontroller 124 that is the accurate measurement or indicator of the actual primary AC current flowing in the primary conductor can be fed on an output line, for example output line 126, to other components or equipment (not shown), such as a display device, a transmitter device, data processing and storage equipment, and the like. Of course, the microcontroller 124 can also be programmed to calculate and output other information, including, for example, electric power and energy information as functions of the primary AC current measurements The factory-determined ratio error and phase angle error correction data for the particular current transformer 104 in a particular current sensor unit 102 can be programmed into the memory device 106 in the factory before installation in the electric circuit of the current sensor unit 102, if desired. However, because the ratio error and the phase angle error can be affected by the packaging of the current transformer 104, thus requiring testing and calibration after the packaging is done, a better approach is to determine the ratio error and phase angle error correction data after the current transformer 104 is fully assembled and packaged in the sensor unit 102. Therefore, the ratio error and phase angle error correction data can also be programmed into the memory device 106 via lines 110, 112 after the current transformer 104, the memory device 106, and the rest of the electric circuit components in the current sensor unit 102 are finally assembled in the current sensor unit 102 and before connecting those lines 110, 112 to an electricity meter 108.

Writing information, such as the ratio error and phase angle error correction factors, into the memory device 106 can be done easily by persons skilled in the art following instructions and explanations provided by the manufacturer of the memory device 106 and usually involves steps similar to reading data out of the memory device 106, as will be understood by persons skilled in the art.

Persons skilled in the art understand that the ratio of the AC current produced in the secondary winding of a current transformer to the AC current in the primary winding is determined by the ratio of the number of turns or loops of conductive wire in the secondary winding to the number of turns of conductive wire in the primary winding, subject to a ratio error that is inherent in any current transformer. Specifically, the ratio of the AC current produced in the secondary winding to the AC current flowing in the primary winding is inversely proportional to the ratio of the number of turns in the secondary winding to the number of turns in the primary winding, again, subject to the ratio error of the particular current transformer. As mentioned above, it is common for current transformer circuitry, for example the current transformer circuitry 132 of the current transformer 104, to include a burden resistance 123 across the secondary winding 122, for example across the first and second winding leads 116, 118, of the current transformer 104, to create a detectable voltage Vs between the first and second winding leads 116, 118, which is indicative of the magnitude and phase of the secondary AC current induced in the secondary winding 122 by magnetic fields created by the AC current in the primary conductor. Accordingly, because of the proportional relationship explained above, the voltage across the burden resistor 123 in the example current sensor unit 102 is also indicative of the magnitude of the AC current flowing in the primary conductor. The burden resistor 123 by nature also introduces ratio and phase angle errors, but the correction data can also correct the current transformer signals for such errors.

Figure 1:
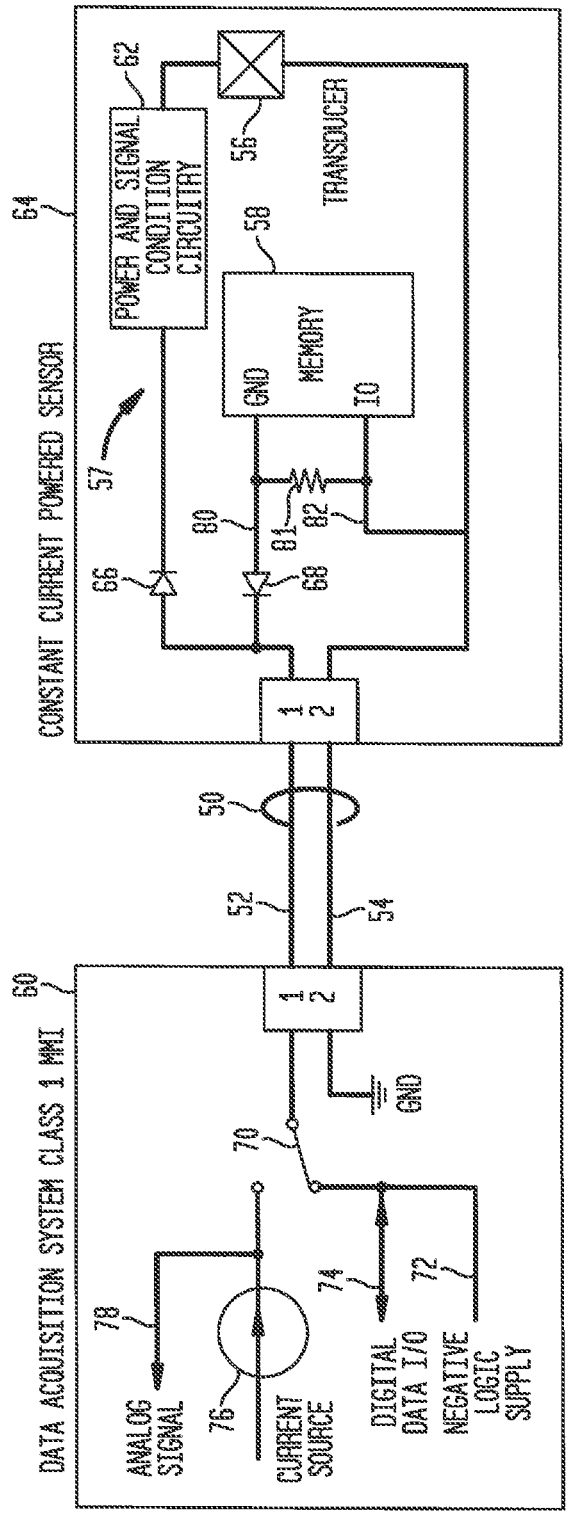
FIG. 1 is a circuit diagram of a prior art, 2-conductor, Class 1, multi-mode interface (MMI) according to the IEEE Standard 1451.4-2004, which in included for background information.

The example electric current metering system 100 illustrated in FIG. 7 has some general similarities to the prior art IEEE 1451.4, Class 1 MMI two-wire interface in FIG. 1, e.g., the memory device 106 in FIG. 7 being a 1-Wire device in which power and data are provided on one wire 134 connected to a single input/output pin IO and with a second wire 136 used for ground reference connected to the GND pin on the memory device 106 for a 2-conductor interface between the current sensor unit 102 and the electricity meter 108. However, that prior art IEEE 1451.4, Class 1 MMI two-wire interface in FIG. 1 requires the switch 70, the negative power supply 72, and the current source 76 in addition to a controller/processor (not shown in FIG. 1) for an electricity meter, as well as the two diodes 66 and 68 and the power and conditioning circuitry 62 in the sensor unit 60. Those components, while functional, involve complexities, overall size issues, and costs that are not desirable for many current transformer applications in which compact size, simplicity, and cost optimization are requirements or at least significant considerations.

In the example electric current metering system 100 illustrated in FIG. 7, the memory device 106 is connected in series with the burden resistor 123 in the current transformer circuitry 132 and in parallel with an isolating resistor 105 in the signal conductor 117 between the electricity meter 108 and the current transformer 104. The signal conductor 117 is an extension of or connected to the first current transformer lead 116. The memory device 106 comprises a 1-Wire chip that operates on a 1-Wire protocol in which power and data are provided on one conductor 134 connected to a single input/output pin IO of the memory device 106, with a second conductor 136 connected to the GND pin of the memory device 106 for ground reference. Such 1-Wire chips are well-known and commercially available from a variety of manufacturers. One example of such 1-Wire chips suitable for this application is a DS28E07 chip manufactured by Maxim Integrated Products, Inc., of San Jose, Calif. The input/output pin IO of the memory device 106 is connected to the signal conductor 117 in front of the isolating resistor 105 by a power and data conductor 134, and the ground pin GND of the memory device is connected to the signal wire 117 on the opposite side of the isolating resistor 105 between the isolating resistor 105 and the burden resistor 123 by a ground reference conductor 136. The burden resistor 123 of the current transformer circuitry 132 is a low value resistor, so the isolating resistor 105 in the signal conductor 117 between the electricity meter 108, and the burden resistor 123 is provided to limit the current supplied from the electricity meter 108 and to develop a voltage between the input/output pin IO and the ground pin GND of the memory device 106 when the electricity meter 108 applies the supply voltage to the memory device 106. To protect against reverse voltages on the memory device 106 from the current transformer 104, a diode 127 is placed in series with the memory device 106, e.g., in the power and data conductor 134, to allow the memory device 106 to be powered only when the correct polarity voltage is present on the input/output pin IO. The isolating resistor 105 is a linear device, so it does not add any non-linearities to the signals from the current transformer circuitry 132 of the current transformer 104, and it is less expensive than a diode. Both of those attributes of the isolating resistor 105 in FIG. 7 over the diode 66 in electric circuitry of the FIG. 1 constant current powered sensor unit 64 contribute to advantages of the current sensor unit 102 in FIG. 7 over the constant current powered sensor unit 64 described above.

In the FIG. 7 example, only the pins on the microcontroller 124 used in the example for these functions are shown. Persons skilled in the art understand that the microcontroller 124 can be programmed and used for a number of additional functions and that other pins on the example microcontroller may exist and can be used as well.

Using the example current transformer 104, memory device 106, and microcontroller 124 mentioned above for illustration, but not for limitation, an example of the electric current metering system in FIG. 7 can be described for illustration, not for limitation. In this example, the current transformer 104 scales a primary AC current with root-mean-square (RMS) range of 0 to 100 amps $AC_{RMS}$ down to a range of 0 to 25 milliamps (mA) $AC_{RMS}$. The burden resistor 123 is 13.33 ohms to provide an output signal 0 to 333.33 millivolts (mV) to represent the range of 0 to 100 amps $AC_{RMS}$ of primary AC current in the primary conductor. Again, the ratio error and phase angle error of the current transformer 104 are measured at the factory and programmed into the memory device 106. The example memory device 106 operates from a supply voltage of 2.8 Vdc to 5.25 Vdc. As explained above, to protect against reverse voltages from the current transformer 104, the diode 127 is placed in series with the memory device 106 to allow the memory device 106 to be powered only when a voltage of the correct polarity above the turn-on threshold of the memory device 106 is present.

As shown in FIG. 7, the first current transformer winding lead 116 is connected via the signal conductor 117 and through the first wire 110 and the connector J to the input/output pin IO1 of the microcontroller 124. A first power conductor 138 in the electricity meter 108 connects the input/output pin IO1 to the connector J1, where connection is made to the first wire 110 of the current sensor unit 102. A data detection resistor 125 is provided in the first power conductor 138, and a second power conductor 140 is connected from the input/output pin IO2 of the microcontroller 124 to the first power conductor 138 between the data detection resistor 125 and the connector J1 for sending messages to and receiving messages from the memory device 106 as will be explained below. The second current transformer winding lead 118 of the current transformer 104 is connected via a return conductor 119 in the current sensor unit 102 and the second conductor 112 of the interconnecting bus or cord 114 and connector J1 to the input/output IO3 of the microcontroller 124. A first reference conductor 142 in the electricity meter 108 connects the input/output pin IO3 to the connector J1, where connection is made to the second wire 112 of the current sensor unit 102. The return conductor 119 can be an extension of the second wire 112. Signal conditioning circuitry 150 in the electricity meter 108 is connected to the first power conductor 138 by a first analog signal conductor 144 and to an analog-to-digital (A/D) function of the microcontroller 124 by a second analog signal conductor 146, e.g., to the analog-to-digital pin A/D, for processing. A second reference conductor 148 connects the signal conditioning circuitry 150 to the first reference conductor 142 to complete the circuits.

On start-up, the memory device 106 is powered by the microcontroller 124 by driving the input/output pin IO1 of the microcontroller 124 high and the input/output pin IO3 low. In this example, the high on the IO1 pin is a nominal 4.7 Vdc (allow for nominal 0.3 V dc voltage drop in the microcontroller 124 at the IO1 pin), and the low on the IO3 pin is 0.3 Vdc. This function provides 4.4 Vdc across the data detection resistor 125, the isolating resistor 105, and the combination parallel resistance of the burden resistor 123 and the winding resistance of the secondary winding (Isource) 122 of the current transformer 104. Since the current transformer circuitry 132 of the current transformer 104 has the low valued burden resistor 123 across its output (typically less than 50 ohms), the isolating resistor 105 is provided to limit the current supplied from the microcontroller 124 when the microcontroller 124 applies the supply voltage to the memory device 106. In the example current sensor unit 102 shown in FIG. 4 in which the memory device 106 is series connected with the current transformer 104, the isolating resistor 105 also develops the voltage across the isolating resistor 105 that allows the memory device 106 to power up as explained above. In this example, the isolating resistor 105 is a 2.7 kilo-ohm resistor, which results in about 1.4 mA of current from the microcontroller 124 to the current sensor unit 102. The input/output pin IO1 of the microcontroller 124 in this example can provide such 1.4 mA of current, as can the input/output pins of many commercially available microprocessors. Accordingly, the voltage at the input/output pin IO of the memory device 106 is the voltage across the isolating resistor 105 minus the diode 127 voltage drop. For a 4.7 Vdc value at the input/output pin IO1 of the microcontroller 124 minus the voltage drops across the data detection resistor 125 (about 0.7 volts), the voltage drop across the diode 127 (e.g., about 0.3 volts for a Schottky diode), the parallel resistance combination of the burden resistor 127 and the secondary winding (Isource) of the current transformer 104 (about 0.07 volts), and the output voltage of the IO3 pin (about 0.3 volts), the result is approximately 3.5 Vdc at the IO pin of the memory device 106. With the memory device 106 powered up in that manner, the memory device 106 is ready for communication with the microcontroller 124.

Figure 8:
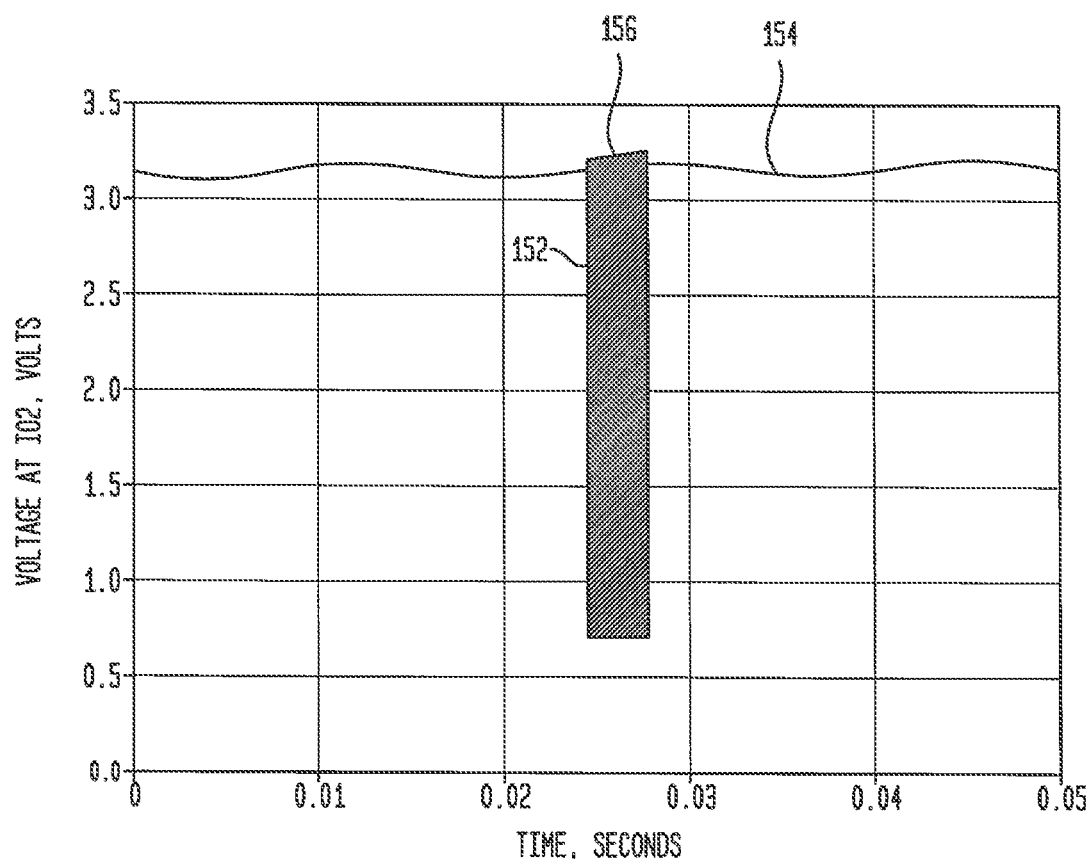
FIG. 8 is a temporal plot of an example communication packet in the presence of a full-scale signal from the analog current transformer signal.

To acquire the ratio error and phase angle error correction data from the memory device 106, the microcontroller 124 drives its input/output pin IO2 high and low to send a message to the memory device 106 according to the protocol for the particular memory device 106. Upon receipt of the message from the microcontroller 124, the memory device 106 responds with a message packet that includes the ratio error and phase angle error correction data for the current transformer 104 by pulling the input/output pin IO of the memory device 106 low for low-level signals and floating the input/output pin IO for high-level signals. The microcontroller 124 detects the high-level and low-level signals from the memory device 106 at the input/output pin IO2 by detecting the voltage across the data detection resistor 125. The analog-to-digital function of the microcontroller 124 could be used as an alternative or as an addition to the data detection resistor 125 to detect and distinguish the high-level and low-level signals from the memory device 106. An example communication packet 152 from the memory device 106 is illustrated graphically in FIG. 8 along with the analog voltage waveform 154 that appears at the input/output pin IO2 of the microcontroller 124. The waveform 154 shows a small ripple in the high-level signals from the current transformer 104. For applications using the series connection illustrated in FIG. 7, a transducer signal Vs larger than about 0.5 volts could interfere with the data communications between the memory device 106 and the microcontroller 124. Such communication interference from the memory device 106 could be filtered from the signal voltage by additional processing in the signal conditioning circuitry 150 or in the microcontroller 124. However, for applications in which the transducer signal Vs will be greater than 0.5 volts, the parallel connection illustrated in FIGS. 3 and 9 may be a better option.

With continuing reference to FIG. 7, after the microcontroller 124 acquires the information, including the ratio error and phase angle error correction factors, from the memory device 106, the microcontroller 124 configures the input/output pins IO1, IO2, and IO3 as unused pins. The input/output pins IO1, IO2, and IO3 may be configured as Schmitt trigger inputs, since the secondary AC current signals may have values between the power supply rails which cause excessive currents to flow in non-Schmitt trigger logic inputs. Alternatively, the pins could be configured as analog mode inputs if available on the microcontroller 124. With the input/output pins IO1, IO2, and IO3 configured as unused pins, the microcontroller 124 is set up to measure the voltage signal Vs that is output from the current sensor unit 102.

As explained above, the burden resistor 123 in electric parallel with the secondary winding 122 (Isource) of the current transformer 104 creates an analog signal voltage Vs between the first and second winding leads 116, 118 of the current transformer circuitry 132, which is indicative of the secondary AC current produced by the secondary winding (Isource) 122. That analog signal voltage Vs, reduced by the isolating resistor 105 (minimally if the signal conditioning circuitry 150 has a high input impedance, or if reduced noticeably can be corrected by the sensor correction data stored in the memory device 106) is presented on the first and second output leads 110, 112 of interconnecting cord or bus 114 to the electricity meter 108. The analog signal voltage Vs peak value should be low enough that the voltage on the input/output pin IO of the memory device 106 stays below the turn-on voltage of the memory device 106 to prevent the memory device 106 from turning on during normal operation, which could cause errors in current measurements by the electricity meter 108. However, if the analog signal voltage Vs does operate in a range high enough to apply a voltage on the input/output pin IO of the memory device 106, then any communication interference from the memory device 106 could be filtered from the signal voltage by additional processing in the signal conditioning circuitry 150 or in the microcontroller 124.

As explained above, the analog signal voltage Vs from the secondary circuit 132 in the current sensor unit 102 is presented to the electricity meter 108 on the first and second output leads 110, 112 in the cord or bus 114. When those first and second output leads 110, 112 are connected to the electricity meter 108 in the connector J1, the analog signal voltage Vs is fed to the signal conditioning circuitry 150 through the first analog signal conductor 144. The signal conditioning circuitry 150 may include, for example, an op-amp and some resistors and capacitors to set the gain and provide filtering, as is understood by persons skilled in the art. The amplified and filtered AC signal is then fed to the analog-to-digital converter pin A/D of the microcontroller 124. In the microcontroller 124, the analog signal voltage is converted to a digital signal and processed to output a digital signal that is a measurement or representation of the primary AC current flowing in the primary conductor on which the current transformer 104 is installed. As also explained above, as part of signal processing, the microcontroller 124 applies the ratio error and phase angle error correction data to the signal received from the current sensor unit 102 so that the signals 126 output by the microcontroller 124 on the input/output pin IO4 are accurate measurements or representations of the actual AC current flowing in the primary conductor.

As explained above and shown in FIG. 7, the memory device 106 in the example current sensor unit 102 is connected to the secondary circuit 132 in electrical series with the burden resistor 123. In the alternative example two-wire sensor measurement and information read-out system 100' illustrated in FIG. 9, the memory device 106 is connected to the current transformer circuitry 132 in electrical parallel to the burden resistor 123 in the manner shown in FIG. 3 and explained above. In all other significant respects, the alternative current sensor unit 102' in FIG. 9 is substantially the same as the current sensor unit 102 in the FIG. 7 example and functions in the same way.

As an alternative communications method to provide and communicate query signals to the memory device 106 in all of the example embodiments described above, after the turn-on power to the memory device 106 is provided, the IO1 pin of the microcontroller 124 can then be switched high and low to send the query message to the memory device 106. When memory device 106 responds, the responding message, which includes the information as explained above, e.g., ratio error and phase angle error corrections data for a current transformer transducer 104, can be detected and received by the analog-to-digital function at the pin A/D of the microcontroller 124 instead of at the input/output pin IO2, in which case the pin IO2 is not needed and the data detection resistor 125 at the IO1 pin may not be needed. With this alternative, the voltage available for turning on the memory device 106 would be higher by 0.5 volts for the values used in the example above.

Figure 9:
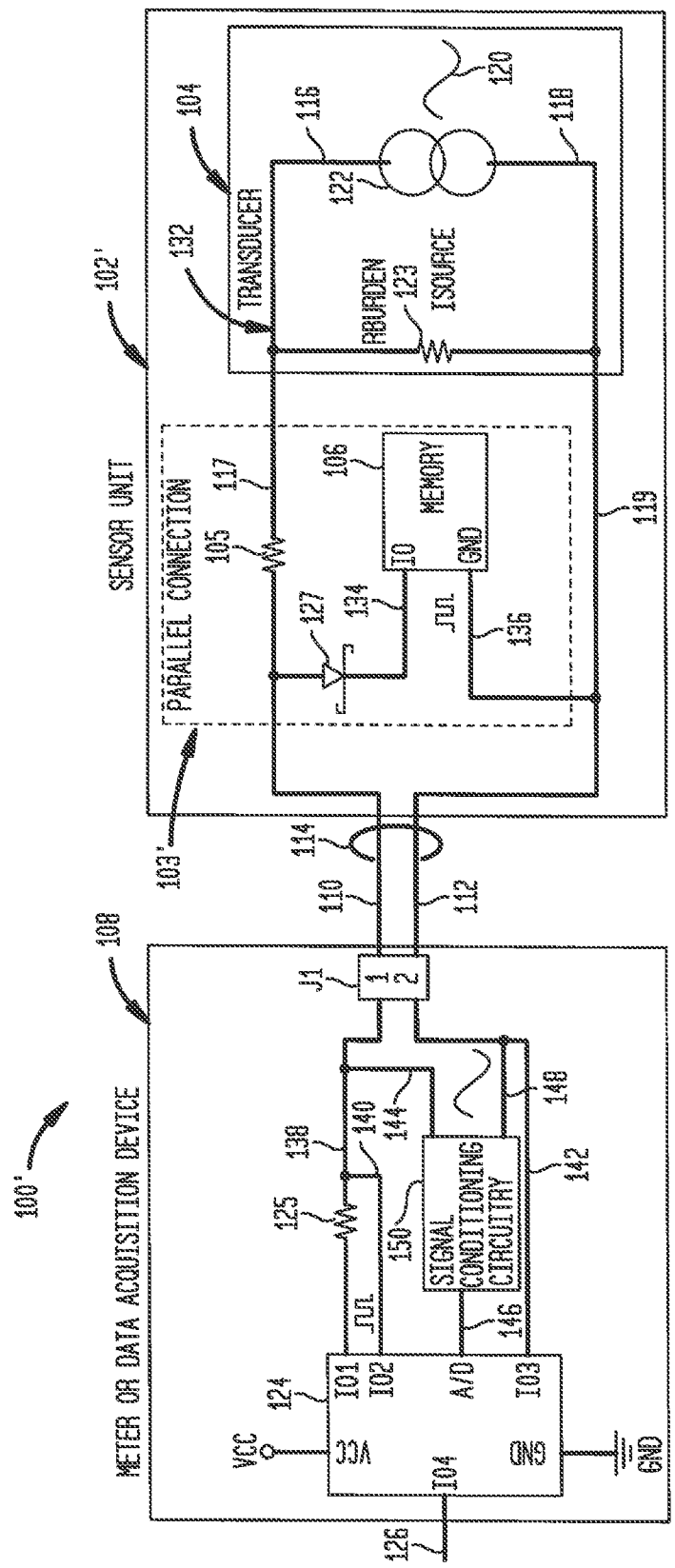
FIG. 9 is a circuit diagram of an alternative embodiment current sensor unit similar to the example current sensor unit in FIG. 7, but where the memory device is connected in parallel to the current transformer instead of series.

As mentioned above, while the example electric current metering systems 100 and 100' shown in FIGS. 7 and 9 and described above included a current transformer for the transducer 104 in the sensor units 102 and 102' for producing an output signal that is indicative of the AC current in a primary conductor, Rogowski coils, are also well-known and can be used as the current transformers in many applications and can be used in the sensor unit 102 in FIG. 7 or the alternative sensor unit 102' in FIG. 9. In a Rogowski coil, a burden resistor is not used because the signals produced by Rogowski coils are analog voltage signals indicative of the AC current flowing in the primary conductor, so the burden resistor 123 in FIGS. 7 and 9 can be eliminated when a Rogowski coil is used as the transducer 104. Using the alternative current sensor unit 102' in FIG. 9 for purposes of explanation, if a Rogowski coil is used as the transducer 104, the Rogowski coil resistance would add to the isolation resistance of the isolating resistor 105 and become part of a total isolation resistance. If the current sensor unit 102' impedance is above several kilo-ohms, then the isolating resistor 105 may not be needed. The operation of the memory device 106 would be the same as described above for the example sensor unit 102'. In general, any transducer 104 with a low voltage output, i.e., less than the turn-on voltage of the memory device 106, which has been observed at 2.8 V peak in the example shown in FIG. 9, can be used in the sensor unit 102' as the transducer 104. If the impedance of the sensor unit 102' is low, the isolating resistor 105 would be used as described above, but, if the impedance of the sensor unit 102' is high, the isolating resistor 105 may not be needed.

While the memory devices 106 in the example electric current metering systems 100, 100' are shown in FIGS. 2, 3, 7, and 9 as being packaged together with the transducer 104 in the sensor units 102, 102', they could be packaged separately. For example, the memory device 106 isolating resistor 105, diode 127, and wires 134, 136 shown enclosed by the phantom lines 103 in FIGS. 2 and 7 could be assembled in their own package outside of the sensor unit 102 and connected instead in the wire 110 between the sensor unity 102 and the data acquisition circuit 108. Similarly, the memory device 106, isolating resistor 105, diode 127, and wires 134, 136 enclosed by the phantom lines 103' in FIGS. 3 and 9 could be assembled in their own package outside of the sensor unit 102' and connected instead in the wires 110, 112 between the sensor unit 102' and the data acquisition circuit 108.

Logic diagrams illustrating the operation of the example two-wire sensor measurement and information read-out systems 100 described above are shown in FIGS. 10 and 11, which demonstrate an example of a method of providing an accurate signal measurement or representation of an AC current flowing in a high power wire or bus bar. The start-up portion of the example operation in which the meter 108 queries and obtains the information from the memory 106 in the sensor unit 102, which may include, for example, the ratio error phase angle error correction data for the current transformer type of transducer 104 as described above and any other desired information from the sensor unit 102, is illustrated in FIG. 10, and an example application of such correction data to provide corrected values of current measurements for energy calculations is illustrated in FIG. 11.

Figure 10:
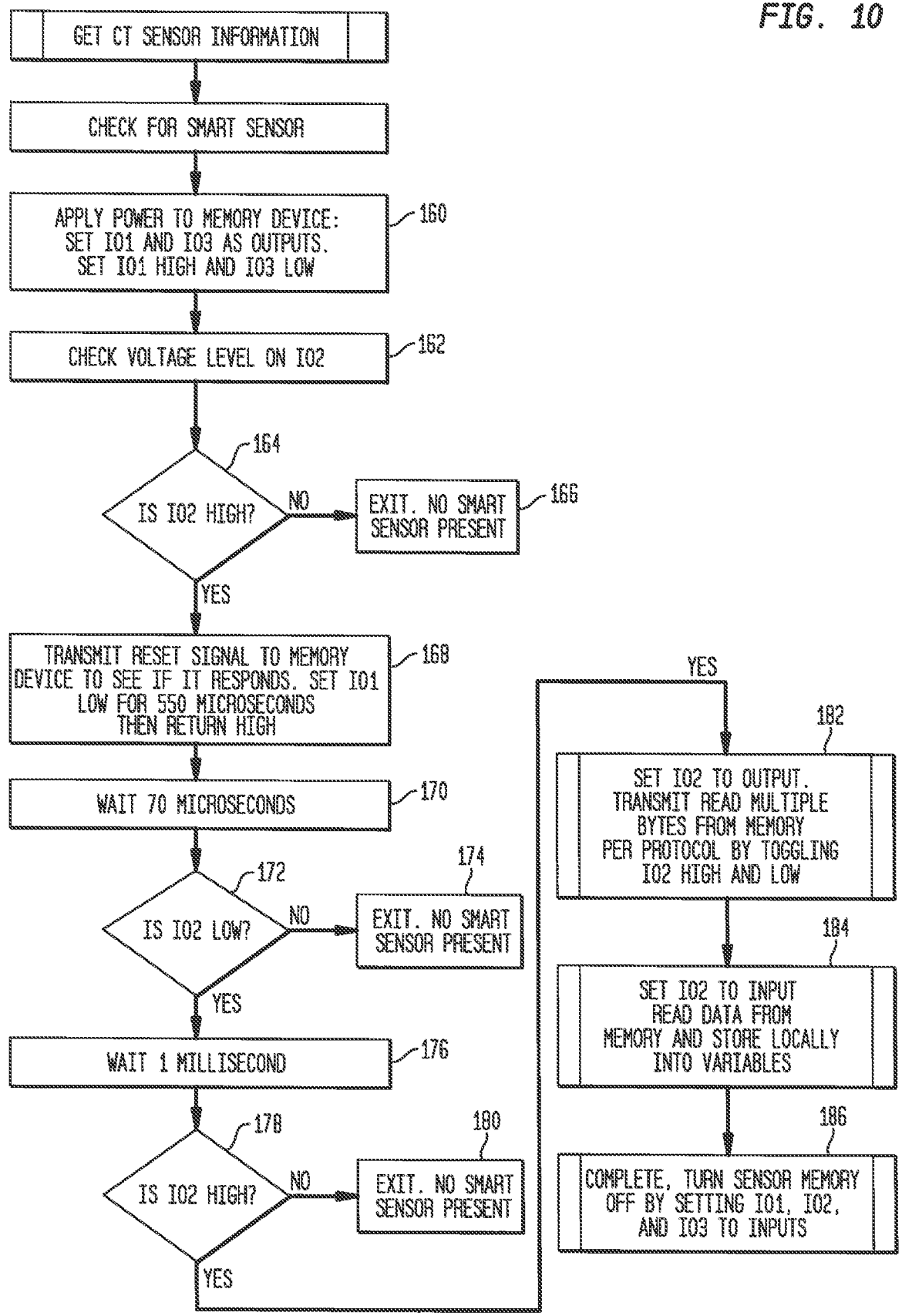
FIG. 10 is a flow diagram of an example start-up and operating logic for the example electricity meter and sensor unit illustrated in FIG. 7 illustrating the retrieval of ratio error and phase angle correction data by the electricity meter from the sensor unit.
Figure 11:
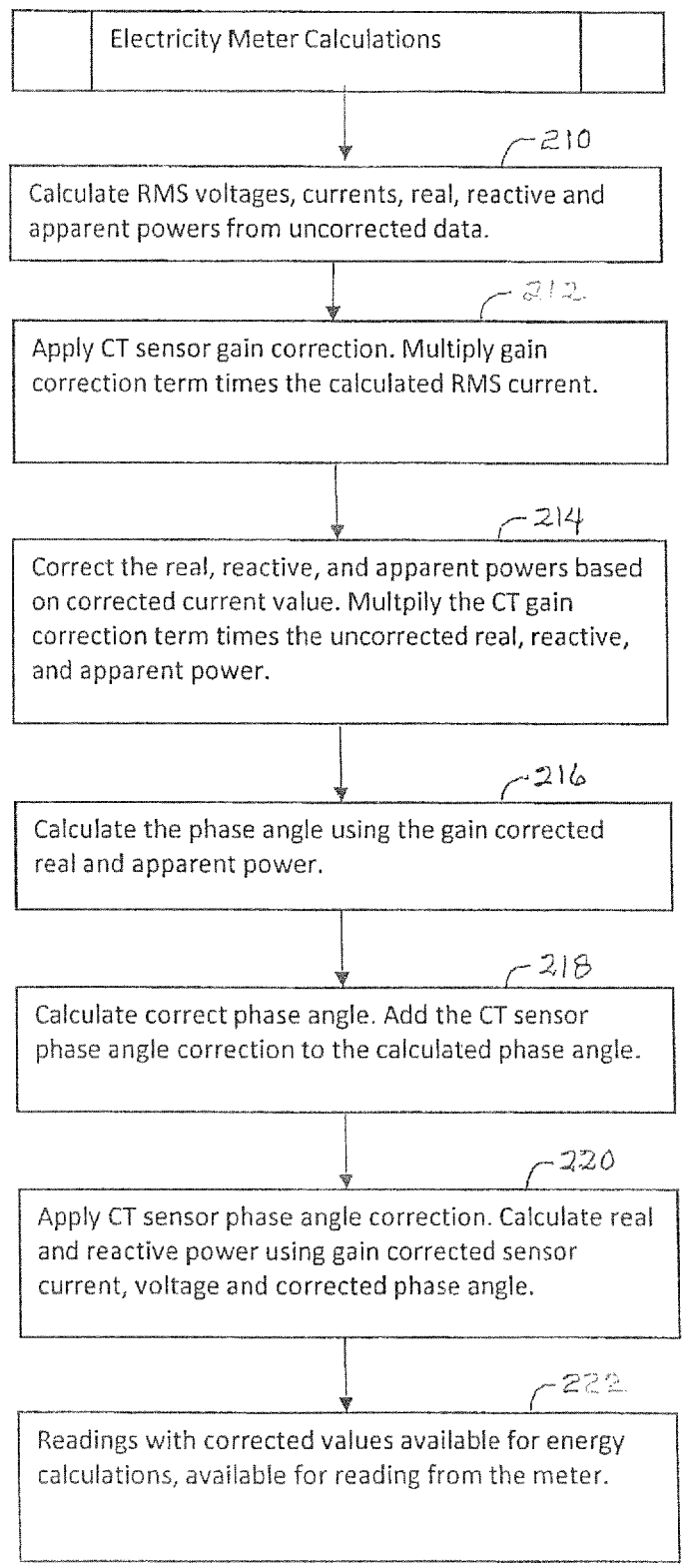
FIG. 11 is a flow diagram of an example application of the ratio error and phase angle error correction data in the electricity meter to the current measurements from the sensor unit.

In the example operation in FIG. 10, the first part of the operation is to check for the sensor unit 102. At step 160, the microcontroller 124 applies power to the memory device 106 by setting the IO1 pin and the IO3 pins of the microcontroller 124 as outputs, including setting the IO1 pin high and setting the IO3 pin low. At step 162, the microcontroller 124 checks the voltage level on pin IO2. The microcontroller 124 makes a decision at step 164 depending on whether the voltage level on pin IO1 is high or low. If the voltage level on pin IO2 is low, there is no sensor unit 102 present or connected to the meter 108, so this logic loop is exited at step 166. However, if the voltage level on the pin IO2 is high, the microcontroller 124 transmits a RESET signal to the memory device 106 at step 168 to see if the memory device 106 responds. If the voltage at IO2 is low, then the sensor isolating resistor 105 is not present. In a typical, non-smart current transformer, the burden resistance 123 is typically much less than the data detection resistor 125, which may be, for example 499 ohms, so the voltage at IO2 will be below the high transition level for IO2. If there is a smart sensor unit 102 present, or if there is no sensor unit present, then the voltage at IO2 will be high since there is no current flow through the data detection resistor 125.

For the RESET signal at step 168, the microcontroller 124 sets the pin IO1 low for a period of time, e.g., 550 microseconds, and then returns the pin IO1 to high. After transmitting the RESET signal at step 168, the microcontroller 124 waits at step 170 for a set period of time, e.g., 70 microseconds, to provide enough time for the memory device 106 to respond. Manufacturers of appropriate memory devices for the memory device 106 as described above provide all the timing, flow charts, and other information necessary for a person skilled in the art to set up such a memory device 106 to respond, so it is not necessary or practical to provide such details in this explanation. After the wait at step 170, the microcontroller 124 tests the voltage on the pin IO2 at step 172 to check the voltage state. A low voltage on pin IO2 would indicate a response from the memory device 106, whereas a high voltage on pin IO2 would indicate no memory device 106 present, i.e., no smart sensor unit 102 present, in which case this logic loop is exited at step 174. Therefore, the microcontroller 124 waits at step 176 for another period of time, e.g., 1 millisecond, for the memory device 106 to release the bus and for the bus to return high. If the pin IO2 is not high at step 178, then there is no sensor unit 102 present or connected, so this logic loop is exited at step 180. However, if the pin IO2 at step 178 is high, it indicates that the memory device 106 has released the bus, and the microcontroller 124 continues to the next step 182, where the microcontroller 124 sets the pin IO2 to output and then transmits a query message to the memory device 106. The query message comprises multiple communication bytes from a memory in or associated with the microcontroller 124 in the meter 108 and is transmitted by toggling the pin IO2 high and low according to a protocol for communication with the memory device 106 in the current sensor unit 102. After sending the query message at step 182, the microcontroller 124 resets the pin IO2 to input in order to receive a return message from the memory device 106 as explained above.

When the memory device 106 in the sensor unit 102 receives the query message from the microcontroller 124, the memory device 106 responds by sending a responsive message with the queried information, for example, the ratio error and phase angle error correction data, back to the microcontroller 124. The responsive message is read at step 184 by the microcontroller 124 at pin IO2 as explained above, or alternatively at the A/D pin as also explained above. The responsive message received by the microcontroller 124 is then stored by the microcontroller 124 into variables in the microcontroller 124 or in a local memory (not shown) associated with the microcontroller 124 in the meter 108 for use in correcting current readings to be received by the microcontroller 124 from the sensor unit 102. The microcontroller 124 then sets the pins IO1, IO2, and IO3 to inputs at step 186, which turns the memory device 106 off and configures the microcontroller 124 for receipt of the analog current measurement signals from the transducer 104. Persons skilled in the art are familiar with a variety of techniques for using the ratio error and phase angle correction data to adjust or correct current transformer signals. According to one example process illustrated in FIG. 11, upon receipt of the analog current measurement signals from the transducer 104 in the current sensor unit 102, the microcontroller 124 in the electricity meter 108 converts the analog signals to digital format and calculates RMS voltages, currents, and real, reactive, and apparent powers using the uncorrected current measurements as indicated at step 210 in FIG. 11. At step 212, the microcontroller 124 applies a ratio error correction term in the correction data (sometimes called a gain correction term) for the transducer 104 to the calculated RMS current from step 210 by multiplying the gain correction term times the calculated RMS current. Then at step 214, the gain correction term is also multiplied by the uncorrected real, reactive, and apparent power values, respectively, to get corrected real, reactive, and apparent power values. In step 216, the microcontroller 124 calculates the phase angle of the measured current using the gain (ratio error) corrected real and apparent power from step 214. Then at step 218, the phase angle correction factor for the current transformer 104 is added to the calculated phase angle to obtain a corrected phase angle for the current. At step 220, the real power and the reactive power are calculated by the microcontroller 124 in a conventional manner, but using the gain (ratio error) corrected current from step 212 and the voltage from step 210 with the corrected phase angle from step 218. The corrected values for current, voltage, and energy (e.g., corrected power) are made available for read-out at step 222.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. A sensor unit comprising:
    sensor circuitry comprising a transducer that generates an analog voltage signal across a first output lead and a second output lead, the analog voltage signal being indicative of a physical characteristic or quantity;
    an isolating resistor in the first output lead in series with the transducer; and
    a 1-Wire memory device with an input/output pin and a ground pin, wherein the input/output pin of the 1-Wire memory device is connected electrically to the first output lead on a first side of the isolating resistor, and wherein the ground pin of the 1-Wire memory device is connected electrically to a second side of the isolating resistor, whereby the 1-wire memory device is addressable with the first output lead and the second output lead, and whereby data in the 1-wire memory device is transmittable with the first output lead and the second output lead.

2. The sensor unit of claim 1, including a diode connected to the input/output pin of the 1-Wire memory device in a manner that protects the 1-Wire memory device from a reverse polarity.

3. The sensor unit of claim 1, wherein the transducer includes a current transformer.

4. The sensor unit of claim 3, including a burden resistor connected electrically in parallel with the current transformer.

5. The sensor unit of claim 4, wherein the ground pin of the 1-Wire memory device is connected electrically to the sensor circuitry between the isolating resistor and the connection of the burden resistor to the first output lead.

6. The sensor unit of claim 1, wherein the transducer includes a Rogowski coil.

7. A sensor unit comprising:
    sensor circuitry comprising a transducer that generates an analog voltage signal across a first output lead and a second output lead, the analog voltage signal being indicative of a physical characteristic or quantity; and
    a 1-Wire memory device with an input/output pin and a ground pin, wherein the input/output pin of the 1-Wire memory device is connected electrically to the first output lead through a diode, and wherein the ground pin of the 1-Wire memory device is connected electrically to the second output lead, whereby the 1-wire memory device is addressable with the first output lead and the second output lead, and whereby data in the 1-wire memory device is transmittable with the first output lead and the second output lead.

8. The sensor unit of claim 7, wherein the transducer includes a current transformer.

9. The sensor unit of claim 8, wherein the current transformer is a Rogowski coil type of current transformer.

10. The sensor unit of claim 8, including a burden resistor connected electrically between the first output lead and the second output lead.

11. The sensor unit of claim 10, wherein the input/output pin of the 1-Wire memory device and the ground pin of the 1-Wire memory device are connected electrically to the sensor circuitry on respectively opposite sides of a combination comprising an isolating resistor and the burden resistor.

12. Sensor apparatus, comprising:
    a transducer that generates an analog voltage signal across a first output lead and a second output lead, the analog voltage signal being indicative of a physical characteristic or quantity; and
    a 1-Wire memory device with an input/output pin and a ground pin, wherein the input/output pin of the 1-Wire memory device is connected electrically to the first output lead through a diode, and wherein the ground pin of the 1-Wire memory device is connected electrically to the second output lead, whereby the 1-wire memory device is addressable with the first output lead and the second output lead, and whereby data in the 1-wire memory device is transmittable with the first output lead and the second output lead.

* * * * *